(12) United States Patent
Matsuo

(10) Patent No.: US 10,675,985 B2
(45) Date of Patent: Jun. 9, 2020

(54) FUEL CELL SYSTEM MOUNTED ON VEHICLE AND CONTROL METHOD THEREOF

(71) Applicant: TOYOTA JIDOSHA KABUSHIKI KAISHA, Toyota-shi, Aichi-ken (JP)

(72) Inventor: Junichi Matsuo, Okazaki (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 16/287,534

(22) Filed: Feb. 27, 2019

(65) Prior Publication Data

US 2019/0275899 A1 Sep. 12, 2019

(30) Foreign Application Priority Data

Mar. 7, 2018 (JP) .................................. 2018-040572

(51) Int. Cl.
*B60L 15/20* (2006.01)
*B60L 7/14* (2006.01)
(Continued)

(52) U.S. Cl.
CPC .............. *B60L 15/2009* (2013.01); *B60L 7/14* (2013.01); *B60L 7/18* (2013.01); *B60L 58/32* (2019.02);
(Continued)

(58) Field of Classification Search
CPC .......... B60L 7/14; B60L 2240/12; B60L 7/18; B60L 15/2009; B60L 2250/26; B60L 58/40; B60L 7/26; B60L 58/32; H01M 16/006; H01M 8/04268; B60T 7/042; B60T 2220/04; B60T 13/586; B60T 13/662; B60T 8/3255; F16D 61/00
See application file for complete search history.

(56) References Cited

U.S. PATENT DOCUMENTS 9,216,639 B2 * 12/2015 Yamamoto ............ F02D 41/065
10,065,506 B2 * 9/2018 Katsuta .................. B60L 3/0015
(Continued)

FOREIGN PATENT DOCUMENTS

| JP | 2011-019379 | 1/2011 |
| JP | 2013-099081 | 5/2013 |
| JP | 2017-135860 | 8/2017 |

*Primary Examiner* — Thai T Dinh
(74) *Attorney, Agent, or Firm* — Finnegan, Henderson, Farabow, Garrett & Dunner, LLP

(57) ABSTRACT

A fuel cell system mounted on a vehicle includes a drive motor generating a driving force and regenerative power; an auxiliary machine consuming the regenerative power; and a controller. The controller determines that the vehicle is in a first state when the vehicle has a negative vehicle speed, a move forward request is given to the vehicle and an accelerator pedal is depressed or when the vehicle has a positive vehicle speed, the move backward request is given to the vehicle and the accelerator pedal is depressed. When a predetermined first condition including a condition that the vehicle is in the first state is satisfied, the controller performs an auxiliary machine consumption process that causes the auxiliary machine to consume the regenerative power that includes a required power for the drive motor calculated by using a depression amount of the accelerator pedal.

10 Claims, 7 Drawing Sheets

(51) Int. Cl.
  *B60L 7/18*      (2006.01)
  *B60T 7/04*      (2006.01)
  *B60L 58/32*     (2019.01)
  *H01M 8/04223*   (2016.01)
  *H01M 16/00*     (2006.01)
  *B60T 13/58*     (2006.01)
  *F16D 61/00*     (2006.01)
  *B60T 13/66*     (2006.01)
  *B60T 1/10*      (2006.01)
  *B60T 8/32*      (2006.01)
  *B60T 8/17*      (2006.01)

(52) U.S. Cl.
  CPC ............... *B60T 1/10* (2013.01); *B60T 7/042* (2013.01); *B60T 8/3255* (2013.01); *B60T 13/586* (2013.01); *B60T 13/662* (2013.01); *F16D 61/00* (2013.01); *H01M 8/04268* (2013.01); *H01M 16/006* (2013.01); *B60L 2210/14* (2013.01); *B60L 2240/12* (2013.01); *B60T 8/17* (2013.01); *B60T 2220/04* (2013.01); *H01M 2250/20* (2013.01)

(56) References Cited

U.S. PATENT DOCUMENTS

| | | | |
|---|---|---|---|
| 10,196,055 B2 * | 2/2019 | Iwamitsu | B60W 20/19 |
| 10,228,698 B2 * | 3/2019 | Mimura | G08G 1/167 |
| 10,324,464 B2 * | 6/2019 | Hatano | G05D 1/0061 |
| 2002/0022927 A1 * | 2/2002 | Lemelson | G08G 1/164 |
| | | | 701/301 |
| 2014/0244096 A1 * | 8/2014 | An | G05D 1/0055 |
| | | | 701/25 |
| 2016/0026180 A1 * | 1/2016 | Tsimhoni | G05D 1/0061 |
| | | | 701/23 |
| 2017/0297586 A1 * | 10/2017 | Li | B60W 50/0098 |

* cited by examiner

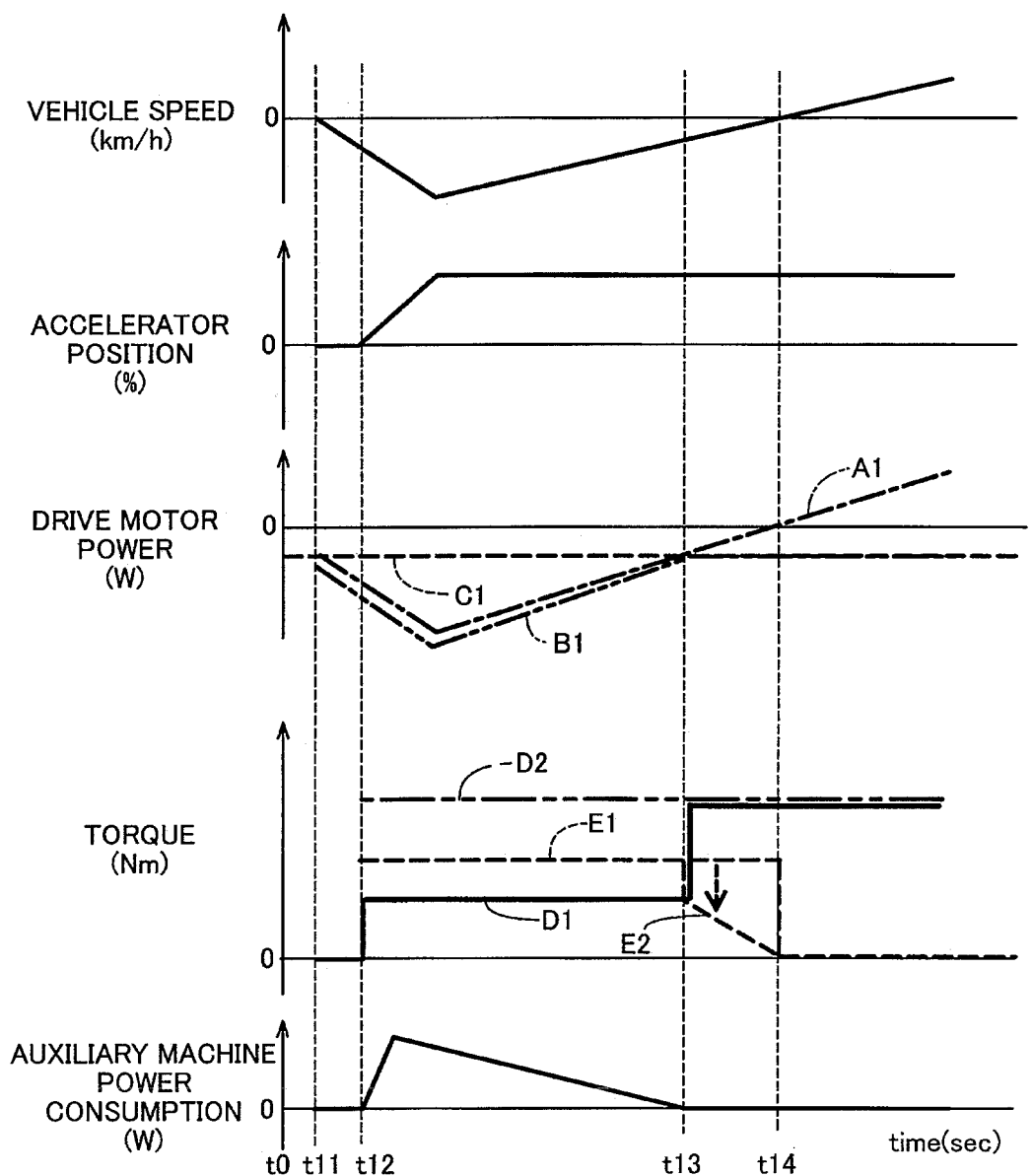

FUEL CELL SYSTEM MOUNTED ON VEHICLE AND CONTROL METHOD THEREOF

CROSS-REFERENCE TO RELATED APPLICATION

The present application claims priority from Japanese patent application 2018-40572 filed on Mar. 7, 2018, the entirety of the content of which is hereby incorporated by reference into this application.

BACKGROUND

Field

The present disclosure relates to a fuel cell system mounted on a vehicle.

Related Art

A known configuration of a fuel cell system mounted on a vehicle causes a secondary battery to be charged with regenerative power from a drive motor. JP 2013-99081A discloses a fuel cell system configured to cause an excess of regenerative power to be consumed by auxiliary machines, when the regenerative power exceeds a chargeable power which the secondary battery is allowed to be charged with.

For example, when a fuel cell vehicle at a stop on an uphill road is going to move forward in response to depression of an accelerator pedal, the vehicle is likely to move back relative to the moving direction. In such a case, a drive motor has a regenerative operation, because of a positive torque output from the drive motor and a negative vehicle speed. Regeneration of electric power generates a braking force to suppress the vehicle from moving back and to allow the vehicle to start in the moving direction. In the case where the regenerative power is not chargeable in the fuel cell system, however, a restriction is to be imposed on regeneration of the drive motor. The inventors of the present disclosure have found that regeneration of the drive motor in such a case is unlikely to stop the vehicle from sliding down to move in an opposite direction to a required moving direction.

SUMMARY

According to one aspect of the present disclosure, there is provided a fuel cell system mounted on a vehicle. The fuel cell system comprises a fuel cell; a secondary battery connected in parallel with the fuel cell; a drive motor configured to serve as a motor to generate a driving force by using electric power from at least one of the fuel cell and the secondary battery and as a generator to generate regenerative power that is usable to charge the secondary battery; an auxiliary machine configured to consume the regenerative power; an accelerator pedal sensor configured to detect a depression amount of an accelerator pedal provided in the vehicle; a shift position sensor configured to detect a move forward request and a move backward request that is given to the vehicle; a vehicle speed sensor configured to detect a vehicle speed of the vehicle; and a controller configured to cause the regenerative power to be consumed by the auxiliary machine. The controller determines that the vehicle is in a first state when the vehicle has a negative vehicle speed, the move forward request is given to the vehicle and the accelerator pedal is depressed or when the vehicle has a positive vehicle speed, the move backward request is given to the vehicle and the accelerator pedal is depressed. When a predetermined first condition including a condition that the vehicle is in the first state is satisfied, the controller performs an auxiliary machine consumption process that causes the auxiliary machine to consume the regenerative power that includes a required power for the drive motor calculated by using the depression amount of the accelerator pedal.

When the vehicle equipped with the fuel cell system is going to move in a required moving direction from the state of sliding-down where the vehicle moves in an opposite direction to the required moving direction, this configuration enables the regenerative power to be consumed by the auxiliary machine. This allows the drive motor to generate the regenerative power and stops the vehicle from sliding down.

BRIEF DESCRIPTION OF DRAWINGS

FIG. 7 is a diagram schematically illustrating variations of various parameters in the auxiliary machine consumption process.

DETAILED DESCRIPTION

First Embodiment

Figure 1:
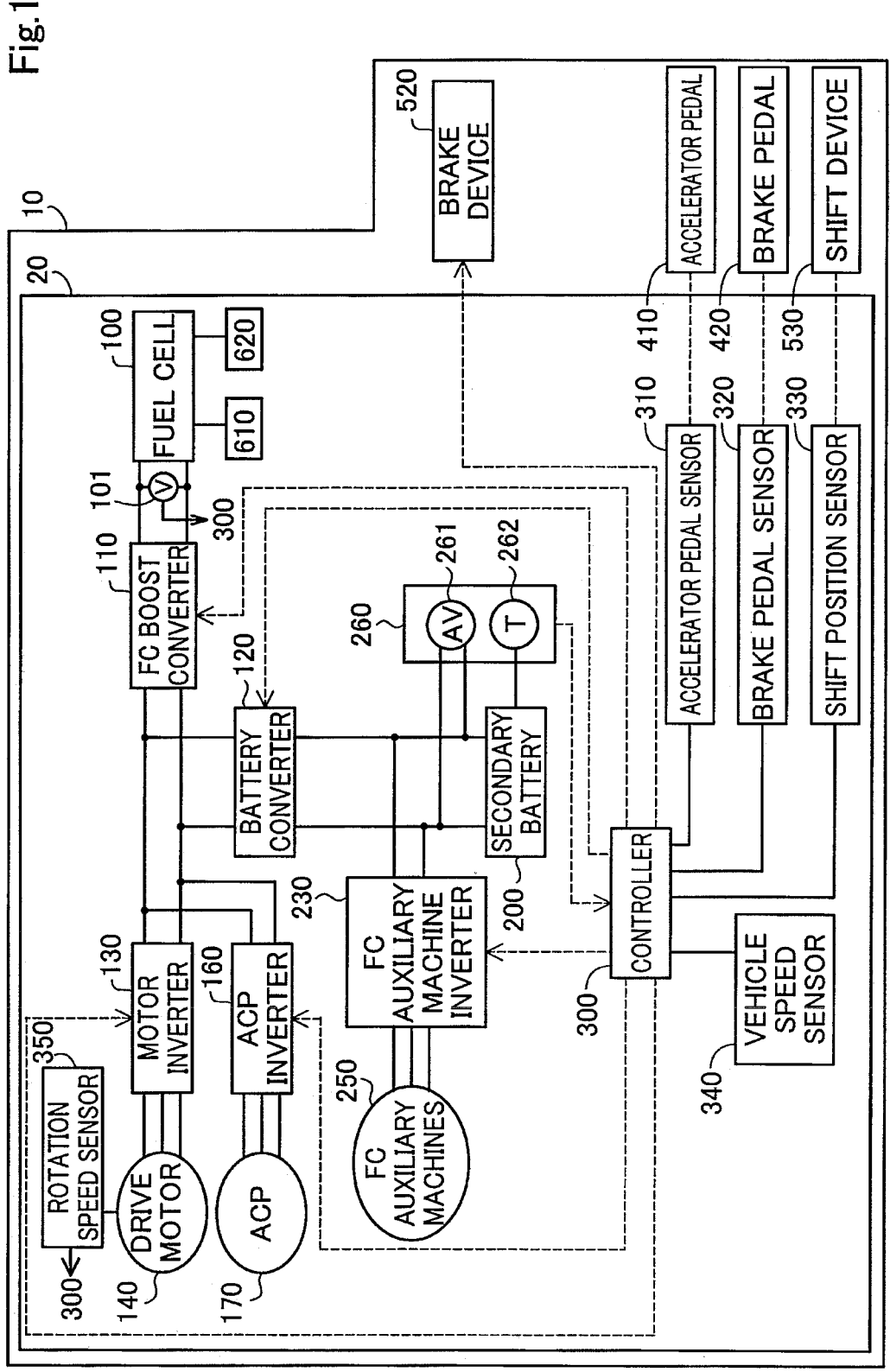
FIG. 1 is a diagram illustrating the schematic configuration of a vehicle with a fuel cell system mounted thereon.

FIG. 1 is a diagram illustrating the schematic configuration of a vehicle 10 with a fuel cell system 20 mounted thereon. The vehicle 10 includes an accelerator pedal 410, a brake pedal 420, a shift device 530, and brake devices 520, in addition to the fuel cell system 20.

The fuel cell system 20 includes a fuel cell 100, an FC boost converter 110, a battery converter 120, a motor inverter 130, a drive motor 140, an ACP inverter 160, an air compressor 170, a secondary battery 200, an FC auxiliary machine inverter 230, FC auxiliary machines 250, a controller 300, a voltage sensor 101, a detector 260 including a battery sensor 261 and a temperature sensor 262, an accelerator pedal sensor 310, a brake pedal sensor 320, a shift position sensor 330, a vehicle speed sensor 340, a rotation speed sensor 350, a fuel gas supplier 610 and an oxidizing gas supplier 620.

The fuel cell 100 is a polymer electrolyte fuel cell configured to generate electric power by reaction of a fuel gas supplied from the fuel gas supplier 610 with an oxidizing gas supplied from the oxidizing gas supplier 620. The fuel gas supplier 610 includes, for example, a fuel gas tank, a fuel gas injector, a fuel gas pump and various valves. The oxidizing gas supplier 620 includes, for example, the air compressor 170 and various valves. The fuel cell 100 is not limited to the polymer electrolyte fuel cell, but any of various other types of fuel cells may be employed for the fuel cell 100.

The FC boost converter 110 is a DC/DC converter configured to step up an output voltage of the fuel cell 100 to a voltage used to drive the drive motor 140. The output voltage of the fuel cell 100 is measured by the voltage sensor 101. The motor inverter 130 is configured to convert the stepped-up DC voltage into a three-phase AC voltage and supply the three-phase AC voltage to drive the drive motor 140.

The drive motor 140 serves both as a motor to generate driving force and as a generator to generate regenerative power. The drive motor 140 includes a rotor with a plurality of permanent magnets embedded around a rotor shaft thereof, and a stator. The rotor shaft of the drive motor 140 is coupled with an axle of the vehicle 10 via a differential gear. When three-phase AC power is supplied to three-phase coils of the stator via the motor inverter 130, the rotor rotates integrally with the rotor shaft to generate the driving force. When the rotor shaft is rotated by an external force, the drive motor 140 generates electric power on respective ends of the three-phase coils and thereby generates regenerative power via the motor inverter 130.

The AC inverter 160 is configured to convert a stepped-up DC voltage into an AC voltage and supply the AC voltage to the air compressor 170. The battery converter 120 is a bidirectional DC/DC converter. The battery converter 120 is configured to step down the voltage of the fuel cell 100 and supply the stepped-down voltage to the secondary battery 200 and to step up the voltage of the secondary battery 200 and supply the stepped-up voltage to the motor inverter 130 and the ACP inverter 160.

The secondary battery 200 is connected in parallel with the fuel cell 100 and serves as a power source to drive the drive motor 140 and the FC auxiliary machines 250. The secondary battery 200 is charged with the electric power from the fuel cell 100 and with the regenerative power from the drive motor 140. The secondary battery 200 is a lithium ion battery according to the embodiment. The secondary battery 200 may be a nickel metal hydride battery or a magnesium battery according to a modification.

The FC auxiliary machine inverter 230 is configured to convert a DC voltage from the secondary battery 200 into an AC voltage and supply the AC voltage to the FC auxiliary machines 250. The FC auxiliary machines 250 include, for example, a fuel gas pump configured to circulate the fuel gas in the fuel cell 100, a cooling water pump configured to circulate cooling water in the fuel cell 100, a heater configured to heat the fuel cell 100 with a view to restraining water in the fuel cell 100 from being frozen, and a radiator fan configured to cool down the cooling water. Auxiliary machines of the vehicle 10 other than the FC auxiliary machine 250 include, for example, an air conditioner, headlights and an illumination device (not shown). In the description below, the air compressor 170, the FC auxiliary machines 250 and the auxiliary machines of the vehicle other than the FC auxiliary machines 250 may be collectively called "auxiliary machines".

The battery sensor 261 is configured to measure the electric current and the voltage of the secondary battery 200, and the temperature sensor 262 is configured to measure the battery temperature of the secondary battery 200. The detector 260 is configured to determine an amount of electric power chargeable into the secondary battery 200 (chargeable amount of power) by using the electric current and the voltage obtained from the battery sensor 261 and the battery temperature obtained from the temperature sensor 262 and send the determined chargeable amount of power to the controller 300. When the chargeable amount of power is lower than a predetermined reference value, the detector 260 sends a signal for imposing a restriction on charging of the secondary battery 200 to the controller 300.

The accelerator pedal sensor 310 is configured to detect a depression amount of the accelerator pedal 410. The brake pedal sensor 320 is configured to detect a depression amount of the brake pedal 420. The depression amount may be reworded as "position". The shift position sensor 330 is configured to detect a shift position of the shift device 530. The shift positions include a position indicating an operator's move forward request given to the vehicle 10 and a position indicating the operator's move backward request given to the vehicle 10. The vehicle speed sensor 340 is configured to detect a vehicle speed from the rotation speed of a driveshaft of the vehicle 10. The vehicle speed sensor 340 outputs a positive vehicle speed when the vehicle 10 moves in a forward direction, while outputting a negative vehicle speed when the vehicle 10 moves in a reverse direction. The rotation speed sensor 350 is configured to detect a rotation speed of the rotor shaft of the drive motor 140.

The brake devices 520 are provided on respective wheels of the vehicle 10 and are configured to brake the vehicle 10. The brake devices 520 may be, for example, disk brakes or drum brakes and are configured to brake the respective wheels with a braking force corresponding to a brake hydraulic pressure applied via a brake line (not shown) in response to the operator's operation of the brake pedal 420 and thereby brake the vehicle 10. The brake line includes a brake piston configured to generate the brake hydraulic pressure corresponding to the depression amount of the brake pedal 420 and a brake hydraulic line. According to a modification, a configuration of actuating an actuator included in the brake device 520 may be employed for the brake line.

The controller 300 is configured by one or more ECUs including a CPU, memories and interfaces. The controller 300 controls the operations of the respective parts of the fuel cell system 20, in response to detection signals from the respective sensors described above. Signal paths from the controller 300 to some of circuits are shown by broken lines in FIG. 1.

The controller 300 controls the motor inverter 130 to cause the drive motor 140 to serve as the motor to generate the driving force by using the electric power from at least one of the fuel cell 100 and the secondary battery 200 and to serve as the generator to generate the regenerative power.

The controller 300 uses the depression amount of the accelerator pedal 410 to calculate a required torque for the drive motor 140. The controller 300 calculates a required power that causes the drive motor 140 to generate the required torque. The required power is calculated according to Expression (1) given below. A drive motor loss in Expression (1) denotes a power loss involved in the drive motor 140 and includes a power loss by the motor inverter 130. The drive motor loss varies with a variation in the required torque for the drive motor 140 and increases with an increase in the required torque. The drive motor loss may be determined in advance by experiment or by simulation. A drive motor rotation speed takes a positive value at a positive vehicle speed, while taking a negative value at a negative vehicle speed.

Required Power [W]=Drive Motor Required Torque [Nm]×Drive Motor Rotation Speed [rpm]×2π/60+Drive Motor Loss [W]   (1)

There are cases where the vehicle 10 stops by depression of the brake pedal 420 on an uphill road and is going to move forward in response to depression of the accelerator pedal 410 when the shift position of the shift device 530 indicates a move forward request. Before the operator of the vehicle 10 changes the foot position from the brake pedal 420 to the accelerator pedal 410, the vehicle 10 is likely to slide down backward and have a negative vehicle speed. When the accelerator pedal 410 is depressed in the event of such sliding-down, this corresponds to reverse rotation regeneration by fourth quadrant operation, because of a positive required torque for the drive motor 140 and a negative vehicle speed. The drive motor 140 is thus enabled to regenerate power.

There are also cases where the vehicle 10 stops by depression of the brake pedal 420 on a downhill road and is going to move backward in response to depression of the accelerator pedal 410 when the shift position of the shift device 530 indicates a move backward request. Before the operator of the vehicle 10 changes the foot position from the brake pedal 420 to the accelerator pedal 410, the vehicle 10 is likely to slide down forward and have a positive vehicle speed. When the accelerator pedal 410 is depressed in the event of such sliding-down, this corresponds to normal rotation regeneration by fourth quadrant operation, because of a negative required torque for the drive motor 140 and a positive vehicle speed. The drive motor 140 is thus enabled to regenerate power. The expression of "the vehicle sliding down" herein means that the vehicle 10 moves in an opposite direction to an intended moving direction on a slope.

The controller 300 determines that the vehicle 10 is in a first state when the shift position sensor 330 detects a move forward request at a negative vehicle speed and the accelerator pedal 410 is depressed or when the shift position sensor 330 detects a move backward request at a positive vehicle speed and the accelerator pedal 410 is depressed. In the first state, an actual moving direction of the vehicle 10 indicated by the vehicle speed sensor 340 is different from a required moving direction indicated by the shift position sensor 330 and it is determined that the vehicle 10 is shifting to a state that the actual moving direction matches with the required moving direction, in response to depression of the accelerator pedal 410. In other words, in the first state, the drive motor 140 is enabled to regenerate power as long as there any component to be charged with or to consume the regenerative power.

The controller 300 performs an auxiliary machine consumption process to cause the regenerative power of the drive motor 140 to be consumed by the auxiliary machines when the vehicle 10 is in the first state.

Figure 2:
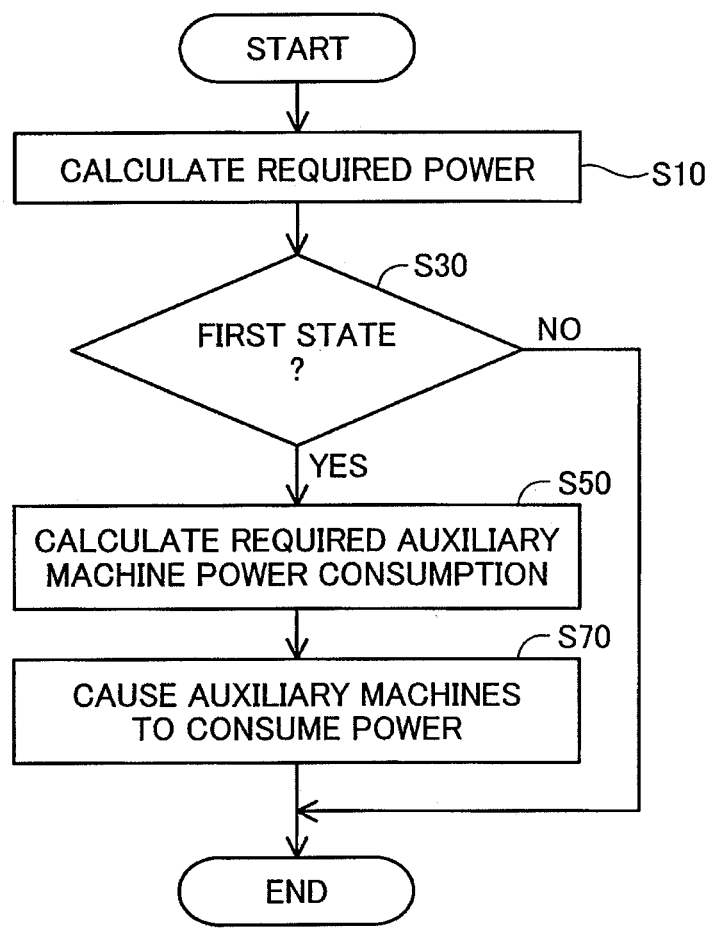
FIG. 2 is a process chart showing an auxiliary machine consumption process.

FIG. 2 is a process chart showing the auxiliary machine consumption process. When the vehicle 10 is started, the controller 300 calculates the required power for the drive motor 140 according to Expression (1) given above (step S10).

The controller 300 subsequently determines whether the vehicle 10 is in the first state (step S30). In the case of NO at step S30, the controller 300 terminates the auxiliary machine consumption process. In the case of YES at step S30, on the other hand, the controller 300 calculates a required auxiliary machine power consumption according to Expression (2) given below (step S50).

Required Auxiliary Machine Power Consumption
 [W]=−Required Power [W]+Auxiliary Machine
 Ordinary Power Consumption [W]   (2)

In Expression (2), the required power has a negative sign, since the required power in the process of regeneration is a negative value. An auxiliary machine ordinary power consumption denotes power consumption of the auxiliary machines required for continuous operation of the vehicle 10, irrespective of the result of determination at step S30. The auxiliary machine ordinary power consumption includes, for example, electric power required for operations of the respective sensors of the vehicle 10 and electric power consumed by the headlights and the like of the vehicle 10 and is calculated in advance by experiment or by simulation.

The controller 300 subsequently causes the auxiliary machines to consume the calculated required auxiliary machine power consumption (step S70). The processing of step S70 increases, for example, the rotation speed of the air compressor 170, the rotation speed of the fuel gas pump, the rotation speed of the cooling water pump and the heating temperature of the heater to be higher than those when the required power is equal to zero or in other words, when the required auxiliary machine power consumption is equal to the auxiliary machine ordinary power consumption.

The controller 300 may calculate the required auxiliary machine power consumption according to Expression (3) given below:

Required Auxiliary Machine Power Consumption
 [W]=−Required Power [W]+Auxiliary Machine
 Ordinary Power Consumption [W]+Secondary
 Battery Discharge Power [W]   (3)

A secondary battery discharge power denotes electric power supplied from the secondary battery 200 to the auxiliary machines. Discharging the secondary battery 200 restrains the regenerative power from becoming insufficient in the case of a transient increase in the auxiliary machine ordinary power consumption.

Figure 3:
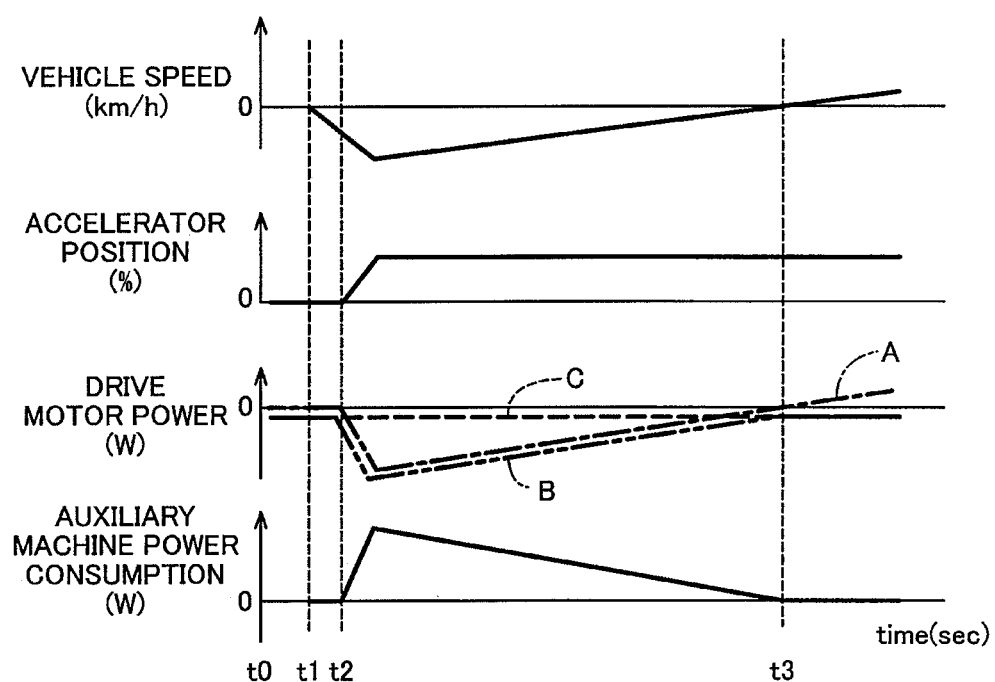
FIG. 3 is a diagram schematically illustrating variations of various parameters in the auxiliary machine consumption process.

FIG. 3 is a diagram schematically illustrating variations of various parameters in the auxiliary machine consumption process. More specifically, FIG. 3 shows variations of the various parameters before and after a certain situation when the shift position sensor 330 detects a move forward request and the vehicle 10 at stop on an uphill road at a time t0 is going to move forward in response to depression of the accelerator pedal 410.

An accelerator position shown as the ordinate of a chart indicates the depression amount of the accelerator pedal 410. The position 0 indicates no depression of the accelerator pedal 410.

A drive motor power shown by the ordinate of a chart indicates power operation of the drive motor 140 at positive values, while indicating regenerative operation of the drive motor 140 at negative values. Graph A shows a variation in required power. Graph B shows a variation in regeneration limit power in the case of performing the auxiliary machine consumption process. The regeneration limit power denotes an upper limit value of regenerative power. The regeneration limit power in the case of performing the auxiliary machine consumption process corresponds to an electric power including the auxiliary machine ordinary power consumption and an auxiliary machine power consumption corresponding to the required power. The graph B shows a variation in value including the secondary battery discharge power and accordingly has the larger negative value than that of the graph A for a time period between a time t2 to a time t3. Graph C shows a variation in regeneration limit power in the case of non-performing the auxiliary machine consumption process. The regeneration limit power shown by the graph C corresponds to the auxiliary machine ordinary power consumption. The auxiliary machine power consumption shown in FIG. 3 does not include the auxiliary machine ordinary power consumption, for ease of explanation.

A time period from a time t1 to the time t2 is a time period when the foot position is changed from the brake pedal 420 to the accelerator pedal 410. In the time period from the time t1 to the time t2, the vehicle 10 slides down to gradually decrease the vehicle speed. When depression of the accelerator pedal 410 is started at the time t2, the vehicle 10 falls into the first state with a negative vehicle speed, a move forward request and depression of the accelerator pedal 410.

After the time t2, regenerative power is generated according to a required torque for the drive motor 140 in response to depression of the accelerator pedal 410. In the time period from the time t2 to the time t3, the regenerative power generated by the drive motor 140 is consumed by the auxiliary machines. The regenerative operation of the drive motor 140 applies a braking force to the vehicle 10 to gradually increase the vehicle speed. After the time t3, the vehicle speed becomes positive, and the drive motor 140 performs the power operation.

When the vehicle 10 is going to move in a required moving direction from the state of sliding-down where the vehicle 10 moves in the opposite direction to the required moving direction, this configuration enables the regenerative power to be consumed by the auxiliary machines. This allows the drive motor 140 to generate regenerative power and stops the vehicle 10 from sliding down.

This configuration causes the regenerative power to be consumed by the auxiliary machines and not to be charged into the secondary battery 200. Even when the lithium ion battery is employed for the secondary battery 200, this configuration reduces degradation of the secondary battery 200 due to transient charge of the secondary battery 200.

Second Embodiment

According to a second embodiment, the controller 300 uses the brake devices 520 to stop sliding down. The brake devices 520 are provided on respective wheels of the vehicle 10 and are configured to brake the vehicle 10. The brake devices 520 may be, for example, disk brakes or drum brakes and are configured to brake the respective wheels with a braking force corresponding to a brake hydraulic pressure applied via a brake line (not shown) in response to the operator's operation of the brake pedal 420 and thereby brake the vehicle 10. The brake line includes a brake piston configured to generate the brake hydraulic pressure corresponding to the depression amount of the brake pedal 420 and a brake hydraulic line. According to a modification, a configuration of actuating an actuator included in the brake device 520 may be employed for the brake line.

Figure 4:
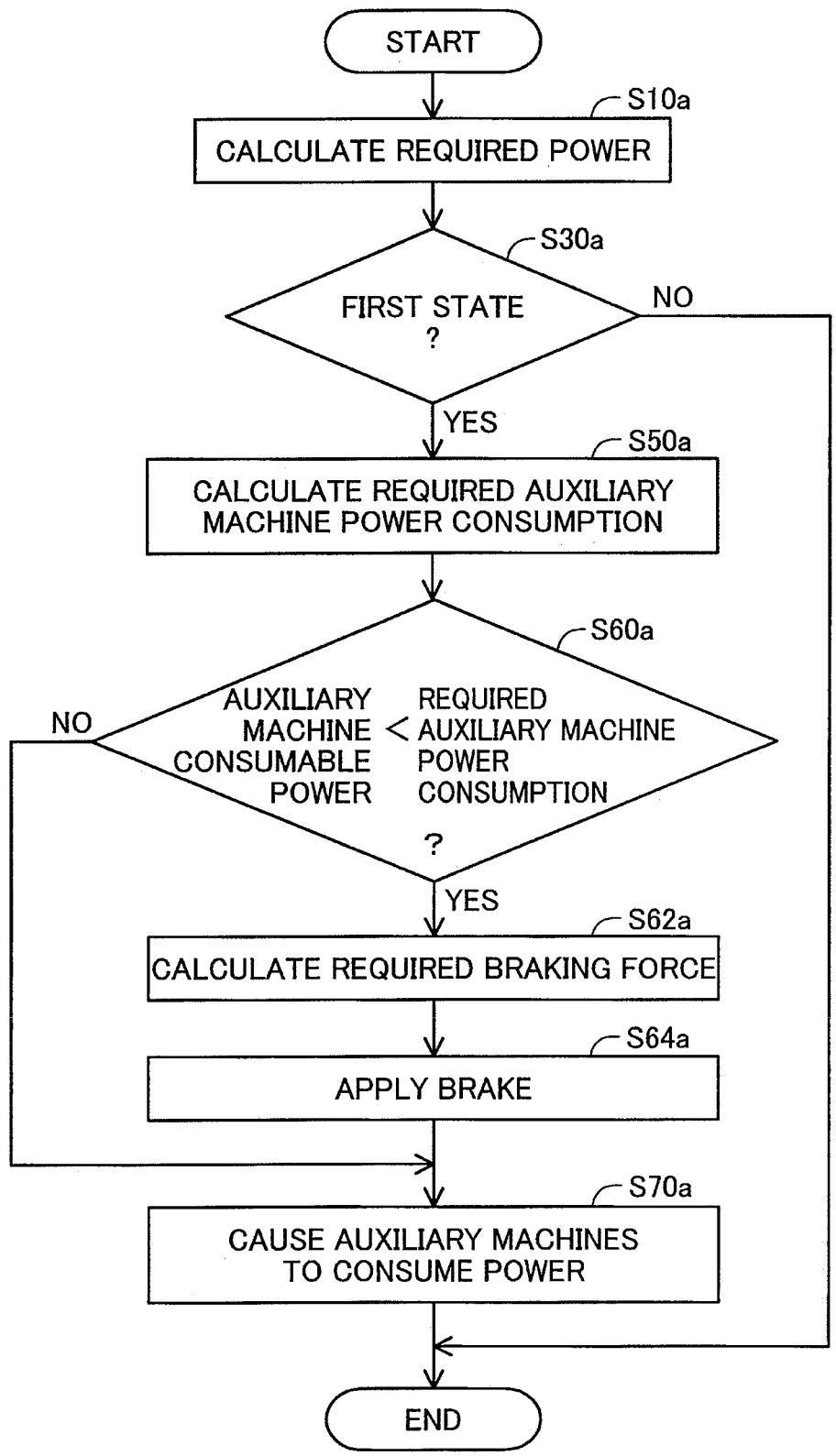
FIG. 4 is a process chart showing an auxiliary machine consumption process according to a second embodiment.

FIG. 4 is a process chart showing an auxiliary machine consumption process according to the second embodiment. The processes of step S10$a$, step S30$a$ and step S50$a$ are respectively similar to the processes of step S10, step S30 and step S50 performed in the first embodiment.

The controller 300 determines whether the electric power required to be consumed by the auxiliary machines, which is calculated from the required power at step S50$a$ (required auxiliary machine power consumption) is larger than an auxiliary machine consumable power (step S60$a$). The auxiliary machine consumable power denotes a maximum power consumption by the auxiliary machines when the vehicle 10 is in the first state. The auxiliary machine consumable power is determined in advance by experiment or by simulation and is stored in the memory included in the controller 300.

When the required auxiliary machine power consumption is larger than the auxiliary machine consumable power (step S60$a$: YES), the controller 30 calculates a required braking force G for the brake devices 520 corresponding to a difference $\Delta W$ between the required auxiliary machine power consumption and the auxiliary machine consumable power (step S62$a$). More specifically, for example, the controller 300 calculates a brake required torque T from the above difference $\Delta 0W$ and rotation speeds of the wheels obtained from rotation speed sensors (Expression (4)). The controller 300 subsequently calculates the required braking force G from the calculated brake required torque T, a vehicle mass M and a wheel radius R (Expression (5)).

$$T[Nm] = \Delta W\ [W] \times 60/(2\pi \cdot N\ [rpm]) \quad (4)$$

$$G = T\ [Nm]/R[m]/(M\ [kg] \times 9.8\ [N/kg]) \quad (5)$$

After calculating the required braking force, the controller 300 causes the brake devices 520 to apply braking according to the calculated required braking force (step S64$a$).

The controller 300 causes the auxiliary machines to consume the required auxiliary machine power consumption calculated at step S50$a$ (step S70$a$), in parallel to the processes of step S60$a$ to step S64$a$. When the auxiliary machine consumable power is equal to or larger than the required auxiliary machine power consumption (step S60$a$: NO), on the other hand, the controller 300 skips the processes of step S62$a$ and step S64$a$ and causes the auxiliary machines to consume the calculated required auxiliary machine power consumption (step S70$a$).

When the required power is larger than the electric power consumable by the auxiliary machines, this configuration causes the brake devices 520 to apply the braking force corresponding to the difference between the required auxiliary machine power consumption and the auxiliary machine consumable power. The brake devices 520 accordingly serve to stop the vehicle 10 from sliding down.

Third Embodiment

According to a third embodiment, the controller 300 is configured to perform high potential avoidance control that causes the fuel cell 100 to generate electric power with a view to preventing the output voltage of the fuel cell 100 from exceeding a high potential avoidance voltage that is determined in advance as an upper limit, in addition to the auxiliary machine consumption process of the first embodiment. The high potential avoidance voltage is determined in advance by experiment or by simulation and is stored in the memory of the controller 300.

Figure 5:
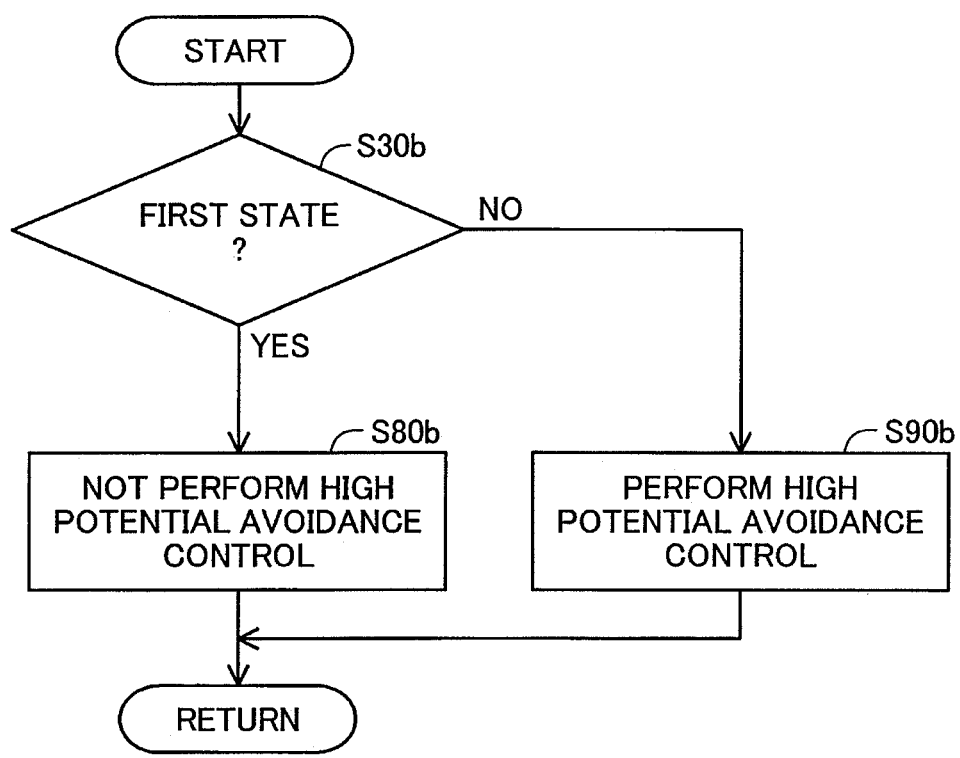
FIG. 5 is a process chart showing a high potential avoidance control process.

FIG. 5 is a process charge showing a high potential avoidance control process in the case of performing the auxiliary machine consumption process. This process is performed in parallel to the auxiliary machine consumption process of the first embodiment.

The controller 300 determines whether the vehicle 10 is in the first state at step S30$b$, like the process of step S30 in the first embodiment. In the case of NO at step S30$b$, the controller 300 performs the high potential avoidance control (step S90$b$). More specifically, when the output voltage of the fuel cell 100 detected by the voltage sensor 101 becomes equal to or higher than a predetermined voltage value that is smaller than the high potential avoidance voltage, the controller 300 controls the fuel gas supplier 610 and the oxidizing gas supplier 620 to supply the fuel gas and the oxidizing gas to the fuel cell 100 and cause the fuel cell to 100 to generate electric power, with a view to preventing the output voltage from exceeding the high potential avoidance voltage.

When the vehicle 10 is in the first state (step S30b: YES), on the other hand, the controller 300 does not perform the high potential avoidance control (step S80b). More specifically, even when the output voltage of the fuel cell 100 detected by the voltage sensor 101 becomes equal to or higher than the predetermined voltage value that is smaller than the high potential avoidance voltage, the controller 300 controls the fuel gas supplier 610 and the oxidizing gas supplier 620 not to supply the fuel gas or the oxidizing gas to the fuel cell 100.

When the vehicle 10 is going to move in a required moving direction from the state of sliding-down, the high potential avoidance control is performed to prevent the fuel cell 100 from generating electric power. This does not cause the generated electric power of the fuel cell 100 to be supplied to the auxiliary machines and accordingly causes the regenerative power to be consumed by the auxiliary machines. This allows the drive motor 140 to generate regenerative power and stops the vehicle 10 from sliding down.

Fourth Embodiment

Figure 6:
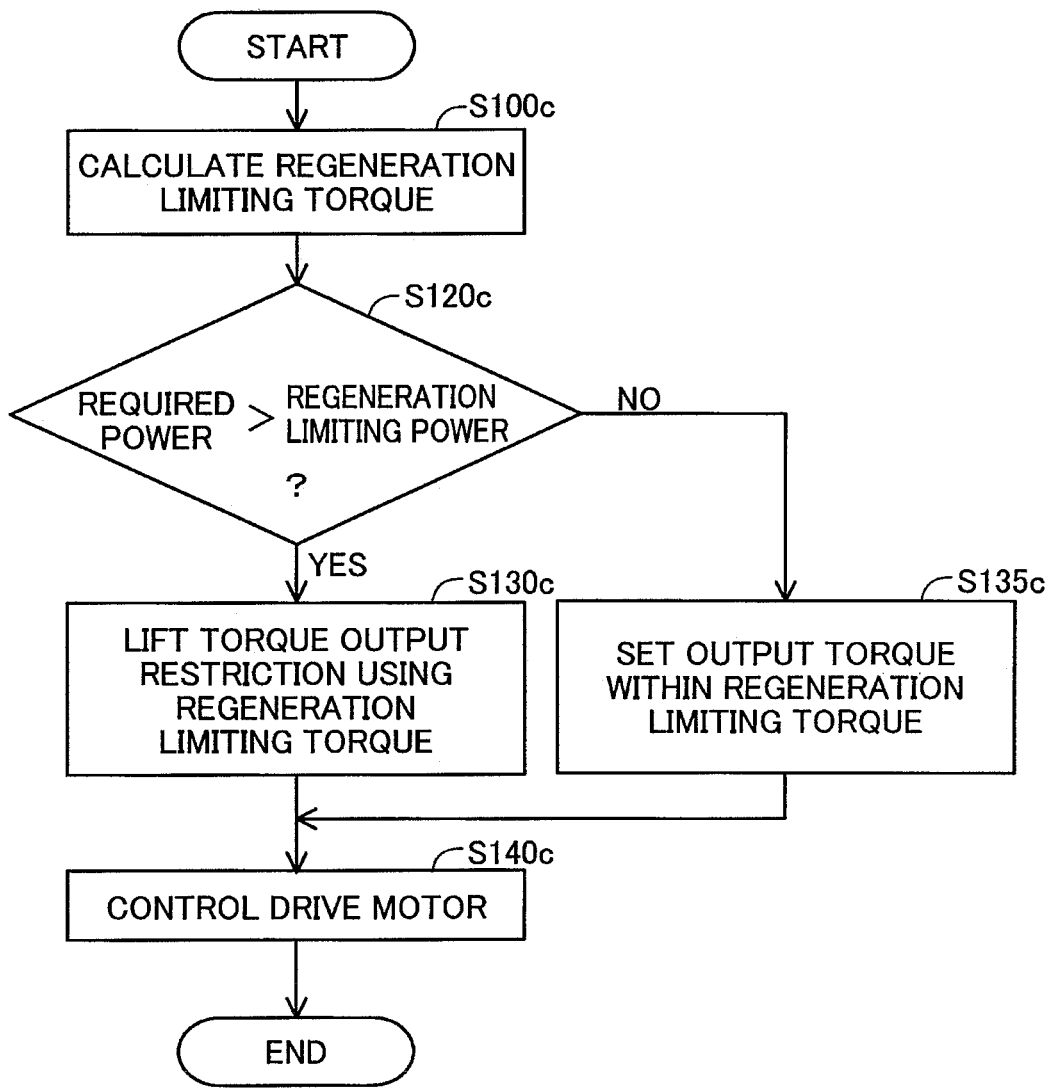
FIG. 6 is a process chart showing a torque output restriction process of a drive motor.

FIG. 6 is a process chart showing a torque output restriction process of the drive motor 140 in the case of performing the auxiliary machine consumption process. According to the fourth embodiment, the controller 300 determines an output torque of the drive motor 140 using a regeneration limiting torque in the auxiliary machine consumption process.

The controller 300 first calculates a regeneration limiting torque (step S100c in FIG. 6). The regeneration limiting torque denotes an upper limit of torque output of the drive motor 140 calculated from a regeneration limit power calculated by using power consumption of the auxiliary machines and an electric power corresponding to a loss of the drive motor 140. For example, the regeneration limiting torque may be calculated according to Expression (6) given below:

Regeneration Limiting Torque [Nm]=(Regeneration limit power+Drive Motor Loss) [W]×60/2π/ Drive Motor Rotation Speed [rpm]    (6)

The controller 300 subsequently determines whether the required power is greater than the regeneration limit power in the case of non-performing the auxiliary machine consumption process (step S120c). When the required power is equal to or less than the regeneration limit power in the case of non-performing the auxiliary machine consumption process (step S120c: NO), the controller 300 sets the output torque of the drive motor 140 within the regeneration limiting torque (step S135c) and controls the drive motor 140 to output the set torque (step S140c).

When the required power is greater than the regeneration limit power in the case of non-performing the auxiliary machine consumption process (step S120c: YES), on the other hand, the controller 300 lifts the torque output restriction using the regeneration limiting torque (step S130c) and controls the drive motor 140 to output the torque corresponding to the required torque (step S140c).

FIG. 7 is a diagram schematically illustrating variations of various parameters in the torque output restriction process. More specifically, FIG. 7 shows variations of the various parameters before and after a certain situation when the shift position sensor 330 detects a move forward request and the vehicle 10 at stop on an uphill road at a time t0 is going to move forward in response to depression of the accelerator pedal 410.

A drive motor power shown by the ordinate of a chart indicates power operation of the drive motor 140 at positive values, while indicating regenerative operation of the drive motor 140 at negative values. Graph A1 shows a variation in required power. Graph B1 shows a variation in regeneration limit power in the case of performing the auxiliary machine consumption process. The graph B1 shows a variation in value including the secondary battery discharge power and accordingly has the larger negative value than that of the graph A1 for a time period between a time t11 to a time t13. Graph C1 shows a variation in regeneration limit power C1 in the case of non-performing the auxiliary machine consumption process. The regeneration limit power shown by the graph C1 corresponds to the auxiliary machine ordinary power consumption.

With regard to a torque value shown by the ordinate of a chart, graph D1 shows a variation in output torque from the drive motor 140, and graph D2 shows a variation in required torque for the drive motor 140. Graphs E1 and E2 show variations in regeneration limiting torque. The auxiliary machine power consumption shown by the ordinate of a chart is similar to that of the first embodiment and is not specifically described here.

A time period from the time t11 to a time t12 is a time period when the foot position is changed from the brake pedal 420 to the accelerator pedal 410. In the time period from the time t11 to the time t12, the vehicle 10 slides down to gradually decrease the vehicle speed. When depression of the accelerator pedal 410 is started at the time t12, the vehicle 10 falls into the first state with a negative vehicle speed, a move forward request and depression of the accelerator pedal 410.

Before the time t13, the required power A1 is not greater than the regeneration limit power C1 in the case of non-performing the auxiliary machine consumption process. The controller 300 accordingly sets the output torque D1 within the regeneration limiting torque E1 calculated from the regeneration limit power B1 (step S135c in FIG. 6). After the time t13, the required power A1 becomes greater than the regeneration limit power C1 (step S120c: YES in FIG. 6). The controller 30 then changes the setting of the regeneration limiting torque from the graph E1 to the graph E2 and lifts the torque output restriction of the drive motor 140 using the regeneration limiting torque (step S130c in FIG. 6). Accordingly, after the time t13, the torque corresponding to the required torque is output from the drive motor 140. As described above, the torque output restriction using the regeneration limiting torque is lifted when the required power A1 becomes greater than the regeneration limit power C1 in the case of non-performing the auxiliary machine consumption process. This is because the required power A1 is calculated to include an electric power corresponding to a drive motor loss.

When the required power becomes greater than the regeneration limit power in the case of non-performing the auxiliary machine consumption process, this configuration lifts the torque output restriction of the drive motor 140 using the regeneration limiting torque. This accordingly enables the torque corresponding to the required torque to be output from the drive motor 140 at the time when the need for causing the regenerative power to be consumed by the auxiliary machines is eliminated.

Another Embodiment 1

In the above embodiments, the controller 300 performs the auxiliary machine consumption process when the vehicle 10 is in the first state. According to a modification, the controller 300 may perform the auxiliary machine consumption process when the vehicle 10 satisfies a predetermined first condition including a condition that the vehicle 10 is in the first state and a restriction is imposed on charging of the secondary battery 200. In the embodiment 1-4 described above, the first condition may be regarded as being satisfied when the vehicle 10 is in the first state. In this modification, the controller 300 may be configured to repeatedly determine whether a signal for imposing a restriction on charging of the secondary battery 200 is input from the detector 260 at predetermined time intervals and sets ON a charging restriction flag indicating the restriction on charging of the secondary battery 200 in response to input of the signal. According to another modification, the controller 300 may cause electric power to be consumed by the auxiliary machines (steps S50 to S70 in FIG. 2 or steps S50a to S70a in FIG. 4) when it is determined that the vehicle 10 is in the first state at step S30 (in FIG. 2) or at step S30a (in FIG. 4). According to another modification, the controller 300 may not perform the high potential avoidance control (step S80b in FIG. 5) when it is determined that the vehicle 10 is in the first state at step S30b (in FIG. 5) and the charging restriction flag is ON. When the vehicle 10 is in the first state and the charging restriction flag is OFF, the controller 300 may cause the drive motor 140 to generate regenerative power and charge the secondary battery 200 with the generated regenerative power.

When the vehicle 10 under the restriction imposed on charging of the secondary battery 200 is going to move in a required moving direction from the state of sliding-down, this configuration enables the regenerative power to be consumed by the auxiliary machines. This configuration accordingly protects the secondary battery 200 and causes the drive motor 140 to generate the regenerative power to stop the vehicle 10 from sliding down. When no restriction is imposed on charging of the secondary battery 200, this configuration enables the secondary battery 200 to be charged with the regenerative power, while causing the drive motor 140 to generate the regenerative power to stop the vehicle 10 from sliding down.

Another Embodiment 2

According to a modification of the above embodiments, the controller 300 may allocate part of the regenerative power of the drive motor 140, which corresponds to a chargeable power, to charging of the secondary battery 200. In this modification, the required auxiliary machine power consumption shown by Expression (2) given above may be replaced by Expression (7) given below. The required auxiliary machine consumption calculated according to Expression (7) given below may be substituted as the required auxiliary machine power consumption in Expressions (4) and (5) given above.

Required Auxiliary Machine Power Consumption [W]=–Required Power [W]+Auxiliary Machine Ordinary Power Consumption [W]–Chargeable Power [W]  (7)

Another Embodiment 3

In the above embodiments, the regeneration limit power may include chargeable power.

Another Embodiment 4

In the second embodiment described above, the brake device 520 may be equipped with a motor serving to brake the vehicle 10 and may be configured to be operated with consuming the power corresponding to a difference between the auxiliary machine consumable power and the required auxiliary machine power consumption.

Another Embodiment 5

Any of the various embodiments described above may be combined appropriately. For example, the second embodiment and the third embodiment may be implemented in combination.

The present disclosure is not limited to any of the embodiments described above but may be implemented by a diversity of other configurations without departing from the scope of the invention. For example, the technical features of any of the above embodiments and the other embodiments corresponding to the technical features of each of the aspects described in Summary may be replaced or combined appropriately, in order to solve part or all of the problems described above or in order to achieve part or all of the advantageous effects described above. Any of the technical features may be omitted appropriately unless the technical feature is described as essential herein. The present disclosure may be implemented by aspects described below.

(1) According to one aspect of the present disclosure, there is provided a fuel cell system mounted on a vehicle. The fuel cell system comprises a fuel cell; a secondary battery connected in parallel with the fuel cell; a drive motor configured to serve as a motor to generate a driving force by using electric power from at least one of the fuel cell and the secondary battery and as a generator to generate regenerative power that is usable to charge the secondary battery; an auxiliary machine configured to consume the regenerative power; an accelerator pedal sensor configured to detect a depression amount of an accelerator pedal provided in the vehicle; a shift position sensor configured to detect a move forward request and a move backward request that is given to the vehicle; a vehicle speed sensor configured to detect a vehicle speed of the vehicle; and a controller configured to cause the regenerative power to be consumed by the auxiliary machine. The controller determines that the vehicle is in a first state when the vehicle has a negative vehicle speed, the move forward request is given to the vehicle and the accelerator pedal is depressed or when the vehicle has a positive vehicle speed, the move backward request is given to the vehicle and the accelerator pedal is depressed. When a predetermined first condition including a condition that the vehicle is in the first state is satisfied, the controller performs an auxiliary machine consumption process that causes the auxiliary machine to consume the regenerative power that includes a required power for the drive motor calculated by using the depression amount of the accelerator pedal.

When the vehicle equipped with the fuel cell system is going to move in a required moving direction from the state of sliding-down where the vehicle moves in an opposite direction to the required moving direction, this configuration enables the regenerative power to be consumed by the auxiliary machine. This allows the drive motor to generate the regenerative power and stops the vehicle from sliding down.

(2) In the fuel cell system of the above aspect, the first condition may include a condition that the vehicle is in the first state and a restriction is imposed on charging of the secondary battery.

When the vehicle under the restriction imposed on charging of the secondary battery is going to move in a required moving direction from the state of sliding-down, this configuration enables the regenerative power to be consumed by the auxiliary machine. This configuration accordingly protects the secondary battery and causes the drive motor to generate the regenerative power to stop the vehicle from sliding down.

(3) In the fuel cell system of the above aspect, the vehicle may be equipped with a brake device configured to brake the vehicle. When the first condition is satisfied and a required power consumption which the auxiliary machine is required to consume according to the regenerative power calculated by using the depression amount of the accelerator pedal is larger than a consumable power which the auxiliary machine consumes, the controller may cause the brake device to apply a braking force corresponding to a difference between the required power consumption and the consumable power.

When the required power is larger than the consumable power which the auxiliary machine consumes, this configuration stops the vehicle from sliding down by using the brake device.

(4) The fuel cell system of the above aspect may further comprise a voltage sensor configured to detect an output voltage of the fuel cell. The controller may perform high potential avoidance control to cause the fuel cell to generate electric power such that the output voltage of the fuel cell does not exceed a high potential avoidance voltage that is determined in advance as an upper limit. The controller may not perform the high potential avoidance control when the first condition is satisfied.

When the vehicle is going to move in a required moving direction from the state of sliding-down, the high potential avoidance control is performed to prevent the fuel cell from generating electric power. This does not cause the generated electric power of the fuel cell to be supplied to the auxiliary machine and accordingly causes the regenerative power to be consumed by the auxiliary machine. This allows the drive motor to generate the regenerative power and stops the vehicle from sliding down.

(5) In the fuel cell system of the above aspect, the controller may calculate the required power by using an electric power that is calculated from a required torque for the drive motor according to the depression amount of the accelerator pedal, and an electric power corresponding to a loss of the drive motor. The controller may impose a torque output restriction on torque output of the drive motor to be within a regeneration limiting torque that is calculated by using a regeneration limit power as an upper limit value of the regenerative power and the electric power corresponding to the loss of the drive motor. When the required power exceeds the regeneration limit power in a case of non-performing the auxiliary machine consumption process, the controller may lift the torque output restriction of the drive motor using the regeneration limiting torque.

When the required power becomes greater than the regeneration limit power in the case of non-performing the auxiliary machine consumption process, this configuration lifts the torque output restriction of the drive motor using the regeneration limiting torque. This accordingly enables the torque corresponding to the required torque to be output from the drive motor at the time when the need for causing the regenerative power to be consumed by the auxiliary machine is eliminated.

The present disclosure may be implemented by any of various aspects other than the aspects of the fuel cell system described above, for example, a fuel cell vehicle, a control method of the fuel cell system mounted on the vehicle, a computer program configured to implement the control method, and a non-transitory storage medium in which such a computer program is stored.

What is claimed is:

1. A fuel cell system mounted on a vehicle, comprising:
   a fuel cell;
   a secondary battery connected in parallel with the fuel cell;
   a drive motor configured to serve as a motor to generate a driving force by using electric power from at least one of the fuel cell and the secondary battery and as a generator to generate regenerative power that is usable to charge the secondary battery;
   an auxiliary machine configured to consume the regenerative power;
   an accelerator pedal sensor configured to detect a depression amount of an accelerator pedal provided in the vehicle;
   a shift position sensor configured to detect a move forward request and a move backward request that is given to the vehicle;
   a vehicle speed sensor configured to detect a vehicle speed of the vehicle; and
   a controller configured to cause the regenerative power to be consumed by the auxiliary machine, wherein
   the controller determines that the vehicle is in a first state when the vehicle has a negative vehicle speed, the move forward request is given to the vehicle and the accelerator pedal is depressed or when the vehicle has a positive vehicle speed, the move backward request is given to the vehicle and the accelerator pedal is depressed, and
   when a predetermined first condition including a condition that the vehicle is in the first state is satisfied, the controller performs an auxiliary machine consumption process that causes the auxiliary machine to consume the regenerative power that includes a required power for the drive motor calculated by using the depression amount of the accelerator pedal.

2. The fuel cell system according to claim 1, wherein the first condition includes a condition that the vehicle is in the first state and a restriction is imposed on charging of the secondary battery.

3. The fuel cell system according to claim 1, wherein the vehicle is equipped with a brake device configured to brake the vehicle, and
   when the first condition is satisfied and a required power consumption which the auxiliary machine is required to consume according to the regenerative power calculated by using the depression amount of the accelerator pedal is larger than a consumable power which the auxiliary machine consumes, the controller causes the brake device to apply a braking force corresponding to a difference between the required power consumption and the consumable power.

4. The fuel cell system according to claim 1, further comprising:
   a voltage sensor configured to detect an output voltage of the fuel cell, wherein the controller performs high potential avoidance control to cause the fuel cell to generate electric power such that the output voltage of the fuel cell does not exceed a high potential avoidance voltage that is determined in advance as an upper limit, and the controller does not perform the high potential avoidance control when the first condition is satisfied.

5. The fuel cell system according to claim 1, wherein the controller calculates the required power by using an electric power that is calculated from a required torque for the drive motor according to the depression amount of the accelerator pedal, and an electric power corresponding to a loss of the drive motor, the controller imposes a torque output restriction on torque output of the drive motor to be within a regeneration limiting torque that is calculated by using a regeneration limit power as an upper limit value of the regenerative power and the electric power corresponding to the loss of the drive motor, and when the required power exceeds the regeneration limit power in a case of non-performing the auxiliary machine consumption process, the controller lifts the torque output restriction of the drive motor using the regeneration limiting torque.

6. A control method of a fuel cell system mounted on a vehicle, the fuel cell system comprising a fuel cell; a secondary battery connected in parallel with the fuel cell; a drive motor configured to serve as a motor to generate a driving force by using electric power from at least one of the fuel cell and the secondary battery and as a generator to generate regenerative power that is usable to charge the secondary battery; and an auxiliary machine configured to consume the regenerative power, the control method comprising:

determining that the vehicle is in a first state when the vehicle has a negative vehicle speed, a move forward request is given to the vehicle and an accelerator pedal provided in the vehicle is depressed or when the vehicle has a positive vehicle speed, a move backward request is given to the vehicle and the accelerator pedal is depressed; and when a predetermined first condition including a condition that the vehicle is in the first state is satisfied, performing an auxiliary machine consumption process that causes the auxiliary machine to consume the regenerative power that includes a required power for the drive motor calculated by using a depression amount of the accelerator pedal.

7. The control method according to claim 6, wherein the first condition includes a condition that the vehicle is in the first state and a restriction is imposed on charging of the secondary battery.

8. The control method according to claim 6, the control method comprising:

when the first condition is satisfied and a required power consumption which the auxiliary machine is required to consume according to the regenerative power calculated by using the depression amount of the accelerator pedal is larger than a consumable power which the auxiliary machine consumes, causing a brake device provided in the vehicle to apply a braking force corresponding to a difference between the required power consumption and the consumable power.

9. The control method according to claim 6, the control method comprising:

when the first condition is not satisfied, performing high potential avoidance control to cause the fuel cell to generate electric power such that an output voltage of the fuel cell does not exceed a high potential avoidance voltage that is determined in advance as an upper limit, and when the first condition is satisfied.

10. The control method according to claim 6, the control method comprising:

calculating the required power by using an electric power that is calculated from a required torque for the drive motor according to the depression amount of the accelerator pedal, and an electric power corresponding to a loss of the drive motor;

imposing a torque output restriction on torque output of the drive motor to be within a regeneration limiting torque that is calculated by using a regeneration limit power as an upper limit value of the regenerative power and the electric power corresponding to the loss of the drive motor; and when the required power exceeds the regeneration limit power in a case of non-performing the auxiliary machine consumption process, lifting the torque output restriction of the drive motor using the regeneration limiting torque.

* * * * *